April 17, 1945.   H. W. SANFORD   2,374,138
PIPE JOINT
Filed Feb. 19, 1941

Inventor
Hugh W. Sanford
By Cyrus Kehr & Swecker
his Attorneys

Patented Apr. 17, 1945

2,374,138

UNITED STATES PATENT OFFICE 2,374,138

PIPE JOINT

Hugh W. Sanford, Knoxville, Tenn.

Application February 19, 1941, Serial No. 379,681

2 Claims. (Cl. 285—157)

This invention relates to an improvement in pipe joints of the character used for joining together disconnected pipes, and more particularly to such joints as unions and couplings.

Heretofore great difficulty has been encountered in the sealing of connected parts of a pipe joint to prevent a leakage of fluid therefrom. Packings of various types, including lead seals, have been provided in such joints, but these have been relatively inefficient, especially with high pressures used in the pipes, and often result in the leakage of fluid when the pipes are connected together and subjected to relatively high pressures, or require hand turning movement by a wrench to produce a sufficiently tight coupled relation to hold the pressure.

The object of this invention is to improve the sealing of a pipe joint or the like, to enable the parts to be joined together readily without any great force being applied thereto, and yet to obtain an effective sealing action against the leakage of fluid.

This object is accomplished by the provision of a gasket of yieldable or resilient material which is attached to the joint in such position as to be pinched between coupled members during the coupling action, sufficiently to start a check-valve action over the crack between the parts of the joint or the coupled members, whereby the force of the pressure within the pipes acts on the resilient or yieldable gasket in a direction approximately normal to the axis of the pipe to increase the sealing action thereof against the leakage of fluid. The threaded connections may be sufficiently loose to be drawn up by hand, and yet the gasket will seal the joint effectively.

The invention is shown in different embodiments in the accompanying drawing, in which.

Figure 1:
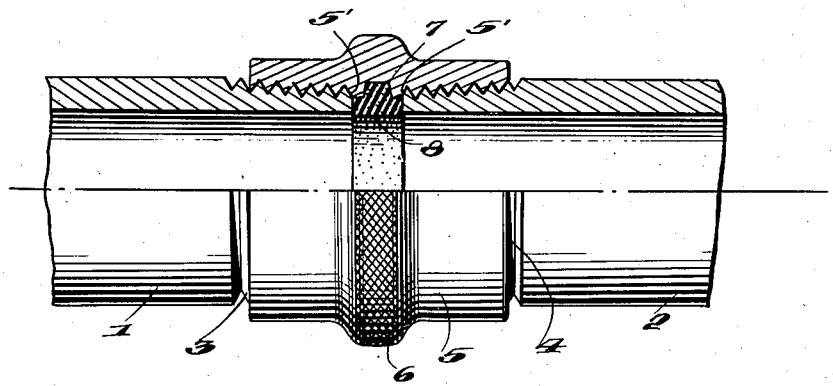
Fig. 1 is a quarter section showing an embodiment of the invention in a pipe coupling.

The invention is shown in Fig. 1 as embodied in a pipe coupling joining together two sections of pipe designated by the numerals 1 and 2. The inner ends of the pipe sections 1 and 2 are screw-threaded at 3 and 4, respectively, for threaded connection with a coupling body 5. The body 5 is of tubular form with internal screw-threads formed in opposite end portions thereof capable of being threaded on the portions 3 and 4 of the pipe sections. These threaded portions are preferably so formed as to constitute relatively loose threaded connections capable of being rotated by hand without the necessity for applying a wrench to the connected parts.

The internal screw-threaded portions of the body 5 are formed with abutments or stops, as indicated at 5', at the inner ends thereof in position to limit the inward screwing of the pipe sections relative thereto. These abutments may be formed either by stopping the threads or by inward projections sufficient to be effective. The body 5 is shown as formed with a peripheral knurled rib 6 thereof to facilitate rotation of the body by hand.

Figure 2:
Fig. 2 is a detail cross section through a sealing gasket detached and under expansion.

Within the body 5 is formed an annular groove 7 adapted to receive a gasket 8 which has a central rib portion 9 with lateral flanges 10 on opposite edges thereof, as shown in Fig. 2. The gasket 8 is formed preferably of relatively soft rubber or rubber-like material or other suitable yieldable or resilient material capable of flexibility and some degree of expansion under pressure, and where high temperatures are involved it may be formed of asbestos materials.

The gasket 8 is of annular form and initially in the shape substantially as shown in Fig. 2, when not applied under pressure in the coupling. However, it is sufficiently yieldable to be inserted in the coupling body 5 with the rib portion 9 in the groove 7, and preferably secured in place therein as by adhesive or other fastening of its periphery in the bottom of the groove, so that the gasket will not drop out when the parts are disconnected. When the pipe sections 1 and 2 are drawn up in the coupling body 5, the flange portions 10 have pressure applied thereto tending to compress the material of the gasket, which pressure is sufficient to apply a tight clamping action against opposite sides of the gasket while the material of the latter is sufficiently resilient to expand in the groove 7 and to overlap the cracks between the pipe sections 1 and 2 and the body 5, so as to seal effectively said cracks against the leakage of fluid therethrough.

Any internal pressure that may be present in the pipe sections will tend to expand the gasket body over the cracks and increase the sealing action thereof, substantially in check-valve effect, whereby a very effective seal is provided. The opposed faces of the pipe sections 1 and 2, where they engage the flanges 10, are approximately normal to the axis of the pipe, as shown in Fig. 1. The inner surface of the gasket is approximately a continuation of the inner surface of the pipe, so that lines of pressure thereagainst will act approximately normal to the axis of the pipe and in a direction tending to force the gasket over the cracks without separation thereof from the pipe ends.

No great amount of endwise pressure is required in drawing up the coupling on the pipe sections 1 and 2, manual pressure being sufficient without the necessity for applying a wrench thereto, because this pressure need be sufficient only to pinch the opposite edges of the gasket flanges 10 between the ends of the pipe sections, holding the gasket in place somewhat expanded, and allowing the internal pressure to which the pipe sections are subjected at the coupling to act on the yieldable gasket and force the same over the cracks sufficient to prevent leakage therethrough. This is true regardless of the pressures applied because the greater the pressure, the greater will be the check-valve action of the gasket increasing the sealing effect thereof.

Figure 3:
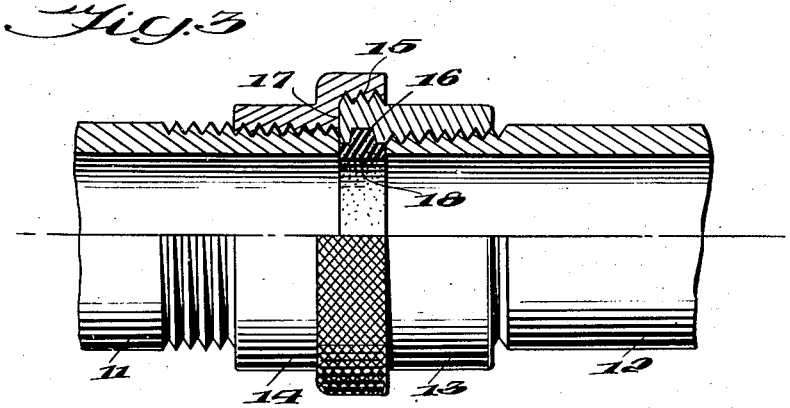
Fig. 3 is a quarter section showing an embodiment of the invention in a pipe union.

The invention is shown in Fig. 3, as applied to a pipe union used to join two sections of pipe 11 and 12. The union is constructed of the two piece type, having male and female sections 13 and 14 screw-threaded together at 15, capable of being connected and disconnected preferably by manual turning of the sections without the necessity for a pipe wrench. The sections 13 and 14 are also shown as screw-threaded on the pipe sections 11 and 12, preferably by means of loose screw-threads capable of being tightened or loosened by hand. The union part 13 has a groove 16 therein adjacent the joint 17 between the parts 13 and 14, and receiving a gasket 18 substantially corresponding with the gasket shown in Figs. 1 and 2 as described above. The gasket 18 has its opposite edges received and pinched between the adjacent ends of the pipe sections 11 and 12 under sufficient pressure for expansion of the gasket over the joint between the union parts, as well as the joints between the respective union parts and the pipe sections, effectively sealing said joints against the leakage of fluid therethrough. The gasket 18 will be retained in place in the groove 16 when the union parts are disconnected, and yet will be in place to provide the desired sealing relation when the parts are drawn up.

Figure 4:
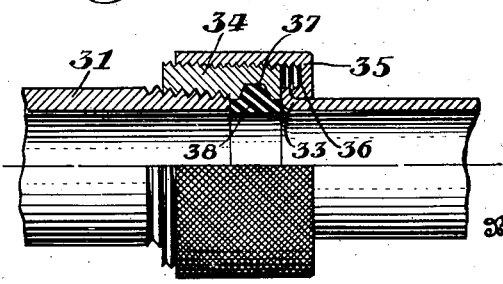
Fig. 4 is a similar view of another form of pipe union.

Another form of union is shown in Fig. 4 for connecting pipe sections 31 and 32 together. In this instance, the pipe section 31 has the usual threaded end while the pipe section 32 has an outwardly flanged end 33 thereon adapted to be clamped between union parts 34 and 35 which are shown as screw-threaded together and the part 35 has a rib 36 on the inner side thereof in position to engage and bear against the flange 33 clamping the latter to the union part 34, while allowing some degree of relatively swinging movement of the pipe section 32. The union part 34 is screw-threaded on the pipe section 31 and has a groove 37 therein receiving and holding a gasket 38, preferably of the character shown in Fig. 2 and described above. The gasket 38 is pinched between the adjacent ends of the pipe sections 31 and 32. This pinching action is sufficient to hold the gasket in place and to seal the cracks between the union part 34 and the respective pipe sections against the leakage of fluid therethrough.

In all of these forms, the sealing action is sufficiently effective, so as to hold as much pressure as the coupled parts themselves will hold without bursting, even though the parts to be joined are coupled up merely by hand without the necessity for using wrenches. The effectiveness of the sealing action does not require leaded joints, ground joints, special machine work or tightly clamping relation between the parts. In assembling pipes in close places, the expense of assembly is reduced very greatly. This reduction in cost is particularly important where pipe installations are to be used only for a very short time and then changed to another location as in marble quarries, coal mines, etc. If leaded joints were used, as have been required heretofore, when the white lead gets dry, it is almost impossible to disconnect the pipes by the force of a pipe wrench without twisting off the pipes, which often results.

For pressures even as high as 100 to 150 pounds per square inch, it has required heretofore a very expensive pipe union that will hold such high pressures. A pipe coupling has required a leaded joint, but lead has not been used ordinarily for the joint of a union. The unions that have been made to hold common city water pressures up to 150 pounds per square inch usually are made so that they can be run up tight with a wrench, but the seat that stops the leakage is made by a steel insert in one part of the brass union casting, which has a ground joint fit with the other part of the union, sufficiently to provide a tight seal when drawn up with a pipe wrench, but this is a very expensive construction, retailing for about 35 to 40 cents. Furthermore, it can be taken apart only by a wrench, even when the pressure is off the pipe line.

When very much higher pressures are used, it has been the common practice to use a union having flanges that are pulled together by several bolts. This involves additional expense and time for assembling and disconnecting. A pipe union including the sealing means of this invention, for a one-half inch pipe line to hold a pressure up to 1000 pounds or 1500 pounds per square inch, can be furnished at a cost of not exceeding five cents. Furthermore, it can be applied and disassembled merely by hand without the use of a pipe wrench.

Where high pressure steam is used in a pipe line which is drawn up tight by a wrench, when the steam is turned on, the high temperature of the steam expands the metal parts, stretching the threads of the connections; then when the pipe line cools off to some extent the connections are not tight and the line leaks. This invention has been tested in a pipe union having a gasket made of asbestos material that will stand a temperature up to 1000 degrees F., and yet the gasket will hold any pressure that the pipe line will hold. The union will seal through quite a range of endwise motion, thus allowing the use of loose threaded connections for easy assembly, and yet the union will be effective.

This is true also of the pipe couplings which are cheaper to construct and easier to apply and remove. Leaded joints are eliminated which avoids the difficulty incurred in making connections that will hold high pressures, which is especially objectionable when the pipe has to be twisted around or otherwise subjected to abuse.

All of these different forms are constructed for repeated use both of the body and of the gasket, inasmuch as the latter cannot be destroyed by forcing the pipe sections or union parts together under too great pressure. Stops or abutments are provided on the body parts to limit the relative inward movement thereof to prevent destruction of the gasket. The gasket is protected thereby against careless destruction, since the sealing action becomes effective upon pressure contact therewith.

I claim:

1. A pipe joint comprising pipe sections having adjacent ends thereof spaced apart, coupling sections surrounding said adjacent ends and having interlocking connections respectively therewith, means for connecting the coupling sections together, one of said coupling sections extending over the space from side to side thereof between the adjacent ends of the pipe sections and having an internal circumferential groove therein between said adjacent ends with opposite sides of said groove spaced inwardly from the opposite sides of said space between the pipe ends, and an annular yieldable gasket interposed between said adjacent ends and having the periphery thereof embraced at opposite sides by said groove.

2. In a pipe joint comprising pipe sections having adjacent ends thereof spaced apart, said pipe ends having opposed surfaces thereof normal to the axis of the pipe sections, means connecting said adjacent ends together and secured on the pipe ends with cracks between said pipe ends and the connecting means, and means in said connecting means for sealing the space between said pipe ends, said sealing means comprising an annular yieldable gasket interposed between said adjacent ends of the pipe sections and pinched therebetween, said gasket bearing against said normal surfaces of the pipe ends at points inwardly of said cracks, said gasket having an inner surface forming substantially a continuation of the bore of the pipe sections so that lines of pressure normal to said inner surface are approximately normal to the axis of the pipe and cause expanding of the gasket over said cracks.

HUGH W. SANFORD.